US011095128B2

(12) United States Patent
Miyazaki et al.

(10) Patent No.: US 11,095,128 B2
(45) Date of Patent: Aug. 17, 2021

(54) VOLTAGE BALANCE CORRECTION CIRCUIT (71) Applicant: FDK CORPORATION, Tokyo (JP)

(72) Inventors: Masatsuru Miyazaki, Tokyo (JP); Norio Fukui, Tokyo (JP)

(73) Assignee: FDK CORPORATION, Tokyo (JP)

(*) Notice: Subject to any disclaimer, the term of this patent is extended or adjusted under 35 U.S.C. 154(b) by 197 days.

(21) Appl. No.: 15/717,860

(22) Filed: Sep. 27, 2017

(65) Prior Publication Data
US 2018/0019600 A1 Jan. 18, 2018

Related U.S. Application Data (63) Continuation of application No. PCT/JP2016/054156, filed on Feb. 12, 2016.

(30) Foreign Application Priority Data

Mar. 30, 2015 (JP) .............................. JP2015-068851

(51) Int. Cl.
*H02J 7/00* (2006.01)
*H01M 10/44* (2006.01)
(Continued)

(52) U.S. Cl.
CPC ......... *H02J 7/0019* (2013.01); *H01M 10/441* (2013.01); *H01M 2010/4271* (2013.01); *H02M 3/33507* (2013.01); *H02M 3/33546* (2013.01)

(58) Field of Classification Search
CPC ...... H02J 7/0016; H02J 7/0014; H02J 7/0019; H01M 10/441
(Continued)

(56) References Cited

U.S. PATENT DOCUMENTS 6,115,277 A * 9/2000 Plichta ................. B60L 3/0046
363/146
6,150,795 A * 11/2000 Kutkut ................. H02J 7/0018
320/118
(Continued)

FOREIGN PATENT DOCUMENTS

JP   2005192281    *  7/2005
JP   2005192281 A  *  7/2005
(Continued)

OTHER PUBLICATIONS

International Search Report dated Mar. 8, 2016, for corresponding PCT Application No. PCT/JP2016/054156.

*Primary Examiner* — Samuel Berhanu
(74) *Attorney, Agent, or Firm* — Kinney & Lange, P.A.

(57) ABSTRACT

A voltage balance correction circuit includes multiple voltage correction circuits that correspond one-to-one to multiple electricity storage cells connected in series, and a control circuit that is configured to control the multiple voltage correction circuits based on voltages of the multiple electricity storage cells. The multiple voltage correction circuits include first coils that are connected to the electricity storage cells in parallel, respectively, field-effect transistors that are configured to turns on/off connections of the first coils with the electricity storage cells, respectively, under control of the control circuit, and second coils that are magnetically respectively coupled with the first coils. In the multiple voltage correction circuits, the second coils are connected in parallel.

3 Claims, 4 Drawing Sheets

(51) Int. Cl.
   *H01M 10/42* (2006.01)
   *H02M 3/335* (2006.01)
(58) Field of Classification Search
   USPC .......................................................... 320/118
   See application file for complete search history.

(56) References Cited

U.S. PATENT DOCUMENTS

| | | | | | |
|---|---|---|---|---|---|
| 6,538,414 | B1* | 3/2003 | Tsuruga | ................ | H02J 7/0016 |
| | | | | | 320/119 |
| 6,583,602 | B2* | 6/2003 | Imai | ..................... | H02J 7/0018 |
| | | | | | 320/118 |
| 6,806,685 | B2* | 10/2004 | Suzuki | ................. | H02J 7/0018 |
| | | | | | 320/116 |
| 8,692,515 | B2* | 4/2014 | Nakao | .................. | H02J 7/0016 |
| | | | | | 320/116 |
| 2009/0322155 | A1* | 12/2009 | Oh | ....................... | H02J 7/0016 |
| | | | | | 307/87 |
| 2010/0231166 | A1* | 9/2010 | Lee | ...................... | H02J 7/0016 |
| | | | | | 320/118 |
| 2010/0253286 | A1* | 10/2010 | Sutardja | ............... | H02J 7/0014 |
| | | | | | 320/118 |
| 2011/0210701 | A1* | 9/2011 | Nakamura | .......... | H01M 10/441 |
| | | | | | 320/118 |
| 2016/0276849 | A1* | 9/2016 | Hamada | ................ | H02J 7/0019 |

FOREIGN PATENT DOCUMENTS

| | | |
|---|---|---|
| JP | 2005192281 A | 7/2005 |
| JP | 2008005630 A | 1/2008 |
| JP | 2008035680 A | 2/2008 |
| JP | 2009540793 A | 11/2009 |
| JP | 2011200095 A | 10/2011 |
| JP | 2013055800 A | 3/2013 |

\* cited by examiner

VOLTAGE BALANCE CORRECTION CIRCUIT

CROSS-REFERENCE TO RELATED APPLICATIONS

This application is a continuation of PCT Application No. PCT/JP2016/054156 filed Feb. 12, 2016, which in turn claims the benefit of Japanese Application No. 2015-068851 filed Mar. 30, 2015, both of which are incorporated by reference in their entirety.

BACKGROUND

Technical Field

The present disclosure relates to a voltage balance correction circuit that equalizes voltages of multiple electricity storage cells connected in series.

Background Art

There is a technique widely used in various fields for driving a load device with electric power stored in multiple electricity storage cells, such as nickel-metal hydride secondary batteries, lithium-ion secondary batteries, and capacitors, that are connected to one another in series. In general, in the multiple electricity storage cells connected in series, voltages of the electricity storage cells are not always equal to one another from their nature. In addition, in the multiple electricity storage cells connected in series, when voltages of each electricity storage cell are in an uneven state, there is a risk that some of the electricity storage cells may be overcharged or overdischarged in charging or discharging.

A well-known example of prior art to solve such a problem is a voltage balance circuit for series cells that includes multiple electricity storage cells connected to one another in series, and multiple transformer coils wound around a single magnetic core with the same number of turns, having ratios of transformation of 1:1 with one another, wherein the multiple electricity storage cells and the multiple transformer coils are respectively connected via switches that perform ON/OFF operation being interlocked with one another, so that voltages of the cells are equalized (e.g., see Patent Document 1).

Another well-known example of prior art to solve the problem described above is a multiple-series-connected electricity storage cell comprising an inter-cell voltage balance correction circuit in which the multiple-series-connected electricity storage cell is divided into multiple series cell groups consecutively arranged in an order of connection to perform voltage balance correction between adjacent cells in each of the cell group, and further an inter-group voltage balance correction circuit for performing balance correction on series voltage of each cell groups by means of AC coupling formed by transformer coils and switching circuits (e.g., see Patent Document 2).

PRIOR ART DOCUMENT

Patent Document

Patent Document 1: Japanese Patent Laid-Open No. 2008-005630

Patent Document 2: Japanese Patent Laid-Open No. 2008-035680

SUMMARY

Problems to be Solved

However, the examples of prior art disclosed in Patent Documents 1 and 2 each have a configuration in which a large number of coils are wound around a single core, and thus involves a problem in that the configurations have to be designed and produced individually in accordance with the number of the intended electricity storage cells, therefore having low versatility. In addition, the examples of prior art described above each have the configuration in which a large number of coils are wound around a single core, and thus involves a problem in that the configuration is often difficult to add or remove an electricity storage cell later and difficult to scale up or down the scale of the configuration flexibly, that is, low in scalability.

The present disclosure is made in view of such circumstances and has an objective to provide a voltage balance correction circuit having high versatility and scalability.

Means for Solving the Problems

<First Aspect>

A first aspect of the present disclosure is a voltage balance correction circuit including: multiple voltage correction circuits corresponding one-to-one to multiple electricity storage cells that are connected to one another in series; and a control circuit configured to control the multiple voltage correction circuits based on voltages of the respective electricity storage cells, wherein the multiple voltage correction circuits each comprise a first coil connected to a corresponding electricity storage cell in parallel, a switch configured to turn on/off connection of the first coil with the corresponding electricity storage cell under control of the control circuit, and a second coil magnetically coupled with the first coil, and in the multiple voltage correction circuits, the second coils of the respective voltage correction circuits are connected to one another in parallel.

For example, the switch ON/OFF of the voltage correction circuit that corresponds to the electricity storage cell having the relatively high voltage is alternated at arbitrary intervals, and the switch of the voltage correction circuit that corresponds to the electricity storage cell having the relatively low voltage is kept in a rectified state. Here, keeping a switch in a rectified state means to maintain a state in which ON/OFF control of the semiconductor switch such as a transistor is not performed. In the state in which the ON/OFF control is not performed, the semiconductor switch such as a transistor has a property of causing current to flow against AC voltage alternating between a positive voltage and a negative voltage only when either one of the voltages is applied, and causing current not to flow when the other voltage is applied. This is caused by an element included in the semiconductor switch such as a transistor, and an element functioning in such a manner is inevitably generated in a process of producing the semiconductor switch such as a transistor.

In the voltage correction circuit corresponding to the electricity storage cell having a relatively high voltage, a voltage of the second coil is lower than a voltage of the first coil, an electric energy discharged by the electricity storage cell is thus converted into a magnetic energy and transmitted from the first coil to the second coil, so that an induced voltage occurs in the second coil, and an AC current flows. In the plurality of voltage correction circuits, the second coils of the respective voltage correction circuits are connected to one another in parallel. Therefore, the AC current flowing through the second coil of the voltage correction circuit corresponding to the electricity storage cell having a relatively high voltage causes AC currents, with the same voltage, to flow through second coils of the voltage correction circuits corresponding to the electricity storage cells having relatively low voltages. Then, in the voltage correction circuit corresponding to the electricity storage cell having a relatively low voltage, a voltage of the second coil is higher than a voltage of the first coil, and electric energy of AC current flowing through the second coil is thus converted into a magnetic energy and transmitted from the second coil to the first coil, so that an induced voltage occurs in the first coil, whereby an electricity storage cell having the relatively low voltage is charged.

That is, by alternating, at arbitrary intervals, ON/OFF of the switch of the voltage correction circuit that corresponds to the electricity storage cell having the relatively high voltage, and then keeping, in a rectified state, switches of voltage correction circuits that correspond to the electricity storage cells having relatively low voltages, electric powers are supplied from the electricity storage cell having a relatively high voltage to the electricity storage cells having relatively low voltages. This causes the electricity storage cell having a relatively high voltage to be discharged, so as to have a decreased voltage and causes the electricity storage cells having relatively low voltages to be charged, so as to have increased voltages, whereby voltage differences between the electricity storage cells are reduced, and finally, the voltages of the electricity storage cells can be equalized.

The multiple voltage correction circuits correspond one-to-one to the multiple electricity storage cells connected in series. In addition, electric connections between the multiple voltage correction circuits are made only by the parallel connection of the second coils. For that reason, in designing and producing the voltage balance correction circuit, it suffices only to consider the number of the intended electricity storage cells, provide the same number of the voltage correction circuits, and connect the second coils of the voltage correction circuits in parallel. As a result, the voltage balance correction circuit according to the present disclosure has few elements to be designed and produced individually in accordance with the number of the intended electricity storage cells, which makes it possible to achieve a high versatility.

In addition, in a case of adding one or more electricity storage cells later, it suffices only to add one or more corresponding voltage correction circuits in accordance with a number of the one or more electricity storage cell to be added and connect one or more second coils of the added one or more voltage correction circuits to the second coils of the existing voltage correction circuits in parallel. Contrariwise, in a case of removing one or more electricity storage cells later, it suffices only to remove one or more corresponding voltage correction circuits in accordance with a number of the removed one or more electricity storage cell and remove connection of one or more second coils of the removed one or more voltage correction circuits. As a result, the voltage balance correction circuit according to the present disclosure allows one or more of the electricity storage cells to be added or removed later easily, achieving a high scalability.

In such a manner, according to the first aspect of the present disclosure, it is possible to obtain an operational advantage of providing a voltage balance correction circuit having high versatility and scalability.

<Second Aspect>

A second aspect of the present disclosure is a voltage balance correction circuit, wherein, in the aforementioned first aspect of the present disclosure, the control circuit alternates ON/OFF of a switch of a voltage correction circuit, out of the plurality of voltage correction circuits, corresponding to an electricity storage cell having a highest voltage of the plurality of electricity storage cells, and meanwhile keeps switches of voltage correction circuits in a rectified state, the voltage correction circuits respectively corresponding to other electricity storage cells.

According to the second aspect of the present disclosure, since an electricity storage cell of the multiple electricity storage cells having the highest voltage is discharged to have a decreased voltage, and other electricity storage cells are charged to have increased voltages, whereby a difference between the voltages of the multiple electricity storage cells can be reduced in a short time and effectively. This can effectively equalize the voltages of the multiple electricity storage cells in a short time.

<Third Aspect>

A third aspect of the present disclosure is a voltage balance correction circuit, wherein, in the aforementioned second aspect of the present disclosure, the control circuit selects an electricity storage cell corresponding to the voltage correction circuit of which a switch is to be kept in a rectified state, in accordance with voltages of the electricity storage cells.

According to the third aspect of the present disclosure, it is possible to reduce unnecessary charging-discharging of the electricity storage cells when equalizing the voltages of each electricity storage cells in the multiple electricity storage cells, whereby the voltages of each electricity storage cells in the multiple electricity storage cells can be equalized in a shorter time, more efficiently.

<Fourth Aspect>

A fourth aspect of the present disclosure is a voltage balance correction circuit, wherein, in any aspect of the aforementioned first to third aspects of the present disclosure, each of the multiple voltage correction circuits comprises a switch driver circuit configured to operate on electric power of a corresponding electricity storage cell to turn on/off the switch.

According to the fourth aspect of the present disclosure, since each of the voltage correction circuits is provided with a switch driver circuit configured to operate on electric power of a corresponding electricity storage cell to turn on/off the switch, which dispenses with an external power supply device or other devices to turn on/off the switch, it is possible to reduce a size of and achieve a power saving of the voltage balance correction circuit.

<Fifth Aspect>

A fifth aspect of the present disclosure is a voltage balance correction circuit, wherein, in any aspect of the aforementioned first to fourth aspects of the present disclosure, the voltage correction circuit is an isolated forward converter circuit constituted by the first coil as a primary winding and the second coil as a secondary winding.

According to the fifth aspect of the present disclosure, since the timing when currents flow is the same for the first coils (primary windings) and the second coils (secondary windings), which thus makes it easy to set timing of ON/OFF control over the switches by the control circuit, it is possible to equalize the voltages of the multiple electricity storage cells with higher precision.

Advantageous Effects

According to the present disclosure, it is possible to obtain an operational advantage of providing a voltage balance correction circuit having high versatility and scalability.

DETAILED DESCRIPTION

Hereafter, an embodiment of the present disclosure will be described with reference to the drawings.

It should be appreciated that the present disclosure is not limited particularly to the embodiment to be described below, and various modifications may be made within the scope of the present disclosure as described and claimed herein.

Figure 1:
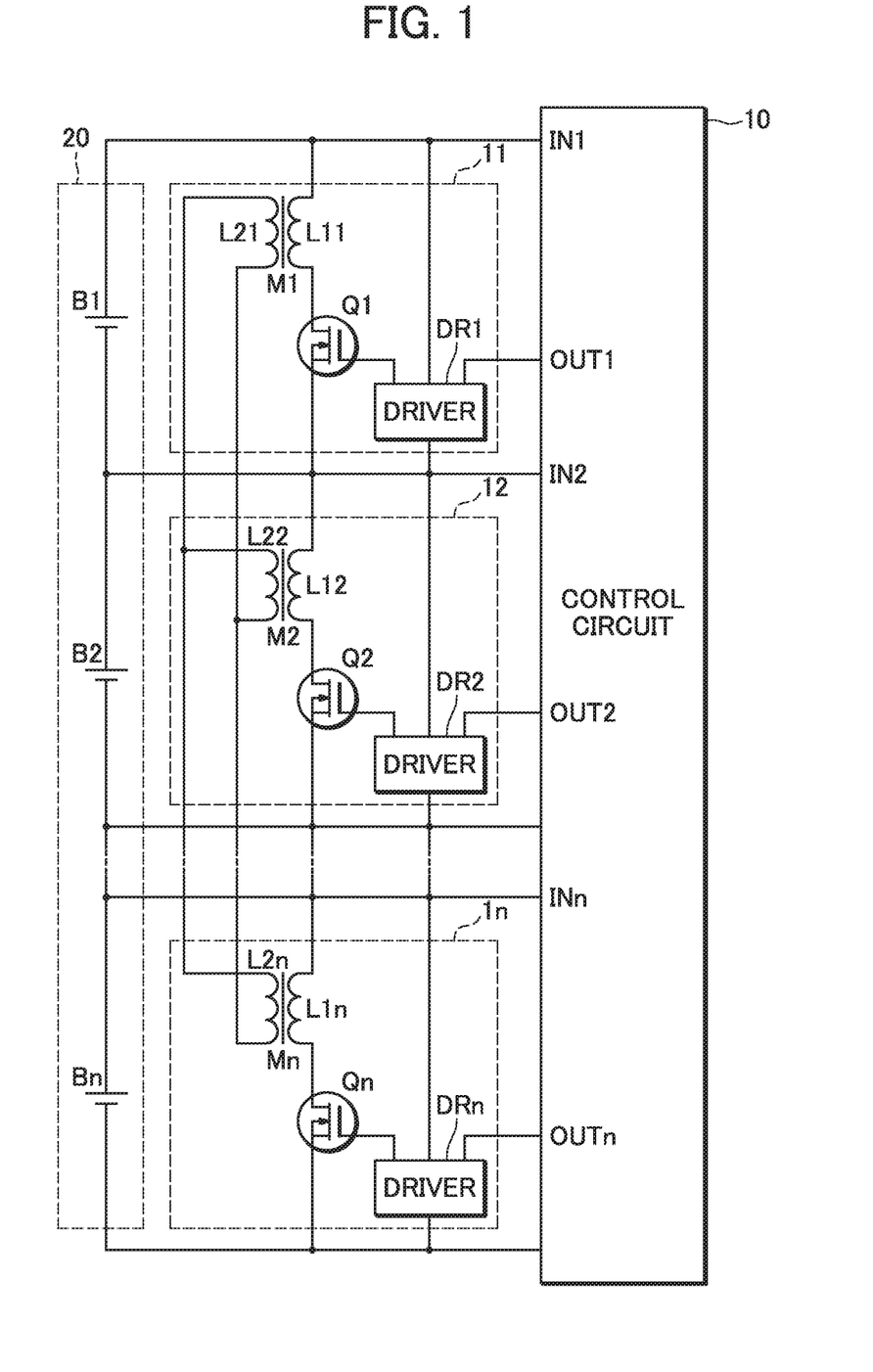
FIG. 1 is a circuit diagram illustrating major parts of a multiple-series-connected high-voltage energy storage unit.

FIG. 1 is a circuit diagram illustrating major parts of a multiple-series-connected high-voltage energy storage unit.

The multiple-series-connected high-voltage energy storage unit includes a control circuit 10, an energy storage module 20, and a number of n of voltage correction circuits 11 to 1n. The energy storage module 20, as "multiple electricity storage cells", includes a number n of electricity storage cells B1 to Bn connected in series. The electricity storage cells B1 to Bn are, for example, rechargeable secondary batteries or energy storage elements, such as nickel-metal hydride secondary batteries, lithium-ion secondary batteries, and capacitors.

A voltage balance correction circuit according to the present disclosure is constituted by the control circuit 10 and the number n of the voltage correction circuits 11 to 1n. The voltage correction circuits 11 to 1n as "multiple voltage correction circuits" all have an identical circuit configuration and correspond one-to-one to the number n of the electricity storage cells B1 to Bn connected in series.

A voltage correction circuit 11 includes a coil L11, a coil L21, a core M1, a field-effect transistor (FET) Q1, and a driver DR1. The coil L11 as "a first coil" is connected to a corresponding electricity storage cell B1 in parallel. The field-effect transistor Q1 as "a switch" turns on/off the connection of the coil L11 to the electricity storage cell B1, under control of the control circuit 10. The coil L21 as "a second coil" is magnetically coupled with the coil L11 via the core M1 made of magnetic substance, so as to constitute a transformer. The driver DR1 as "a switch driver circuit" operates on electric power of the electricity storage cell B1 and turns on/off the field-effect transistor Q1.

A voltage correction circuit 12 includes a coil L12, a coil L22, a core M2, a field-effect transistor Q2, and a driver DR2. The coil L12 as "a first coil" is connected to a corresponding electricity storage cell B2 in parallel. The field-effect transistor Q2 as "a switch" turns on/off the connection of the coil L12 to the electricity storage cell B2, under control of the control circuit 10. The coil L22 as "a second coil" is magnetically coupled with the coil L12 via the core M2 made of magnetic substance, so as to constitute a transformer. The driver DR2 as "a switch driver circuit" operates on electric power of the electricity storage cell B2 and turns on/off the field-effect transistor Q2.

A voltage correction circuit 1n includes a coil L1n, a coil L2n, a core Mn, a field-effect transistor Qn, and a driver DRn. The coil L1n as "a first coil" is connected to a corresponding electricity storage cell Bn in parallel. The field-effect transistor Qn as "a switch" turns on/off the connection of the coil L1n to the electricity storage cell Bn, under control of the control circuit 10. The coil L2n as "a second coil" is magnetically coupled with the coil L1n via the core Mn made of magnetic substance, so as to constitute a transformer. The driver DRn as "a switch driver circuit" operates on electric power of the electricity storage cell Bn and turns on/off the field-effect transistor Qn.

Through the voltage correction circuits 11 to 1n having the configuration described above, coils L21 to L2n are connected to one another in parallel.

The turns ratio between coils L11 to L1n and the coils L21 to L2n is not limited particularly to 1:1 and can be set as appropriate in accordance with a rated voltage and properties of the electricity storage cells B1 to Bn, specifications of the voltage balance correction circuit, and the like. For example, in a case where currents flowing through the coils L21 to L2n are intended to be lowered, the turns ratio may be set so as to make voltages of the coils L21 to L2n higher than voltages of the coils L11 to L1n. The field-effect transistors Q1 to Qn are, for example, but not limited particularly to, N channel metal-oxide-semiconductor field-effect transistors (MOSFETs), and use can be made of various switching elements such as a bipolar transistor, for example. The drivers DR1 to DRn are, for example, but not limited particularly to, switching regulators each including a control terminal (ON/OFF terminal), and use can be made of various driver circuits.

In addition, for the field-effect transistors Q1 to Qn, it is preferable to select an element that is turned on with a gate voltage that is lower than the rated voltage of the electricity storage cells B1 to Bn, and it is preferable to make the drivers DR1 to DRn into circuits that operate on electric power of the corresponding electricity storage cells B1 to Bn, as in the present embodiment. This configuration dispenses with an external power supply (device) in order to turn on/off the field-effect transistors Q1 to Qn, which makes it possible to reduce a size of and achieve a power saving of the voltage balance correction circuit.

The control circuit 10 is, for example, a well-known microprocessor control circuit or control integrated circuit (IC) and controls the voltage correction circuits 11 to 1n based on voltages of the electricity storage cells B1 to Bn. The control circuit 10 includes a number n of input terminals IN1 to INn, and a number n of output terminals OUT1 to OUTn. An input terminal IN1 is connected to a positive electrode terminal of the electricity storage cell B1. An input terminal IN2 is connected to a positive electrode terminal of the electricity storage cell B2. An input terminal INn is connected to a positive electrode terminal of the electricity storage cell Bn. An output terminal OUT1 is connected to a control terminal of the driver DR1. An output terminal OUT2 is connected to a control terminal of the driver DR2. An output terminal OUTn is connected to a control terminal of the driver DRn.

Note that, for example, in a case of using nickel-metal hydride secondary batteries as the electricity storage cells B1 to Bn, it is preferable to further provide the electricity storage cells B1 to Bn with respective temperature sensors (not illustrated) and to input output signals from the temperature sensors into the control circuit 10 so as to allow the control circuit 10 to detect temperatures of the electricity storage cells B1 to Bn.

For example, assume here that the voltage of the electricity storage cell B1 is relatively higher than voltages of other electricity storage cells B2 to Bn. In such a state, the control circuit 10 alternates ON/OFF of the field-effect transistor Q1 at arbitrary intervals, the field-effect transistor Q1 being of the voltage correction circuit 11 that corresponds to the electricity storage cell B1 having the relatively high voltage. The control circuit 10 then keeps field-effect transistors Q2 to Qn in a rectified state, the field-effect transistors Q2 to Qn being of voltage correction circuits 12 to 1n that correspond to the electricity storage cells B2 to Bn having relatively low voltages. Then, in the voltage correction circuit 11 corresponding to the electricity storage cell B1 having a relatively high voltage, a voltage of the second coil L21 is lower than a voltage of the first coil L11, an electric energy discharged by the electricity storage cell B1 is thus converted into a magnetic energy and transmitted from the first coil L11 to the second coil L21, so that an induced voltage occurs in the second coil L21, and an AC current flows through the second coil L21.

In the voltage correction circuits 11 to 1n, the second coils L21 to L2n are connected to one another in parallel. Therefore, the AC current flowing through the second coil L21 of the voltage correction circuit 11 corresponding to the electricity storage cell B1 having a relatively high voltage causes AC currents, with the same voltage as the induced voltage, to flow through second coils L22 to L2n of the voltage correction circuits 12 to 1n corresponding to the electricity storage cells B2 to Bn having relatively low voltages. Then, in the voltage correction circuits 12 to 1n corresponding to the electricity storage cells B2 to Bn having relatively low voltages, voltages of the second coils L22 to L2n becomes higher than voltages of first coils L12 to L1n, and then electric energies of the AC currents flowing through the second coils L22 to L2n are converted into magnetic energies and transmitted from the second coils L22 to L2n to the first coils L12 to L1n, respectively, so that induced voltages occur in the first coils L12 to L1n, whereby the electricity storage cells B2 to Bn having relatively low voltages are charged.

That is, by alternating ON/OFF of the field-effect transistor Q1 at arbitrary intervals, the field-effect transistor Q1 being of the voltage correction circuit 11 that corresponds to the electricity storage cell B1 having the relatively high voltage, and then keeping field-effect transistors Q2 to Qn in a rectified state, the field-effect transistors Q2 to Qn being of voltage correction circuits 12 to 1n that correspond to the electricity storage cells B2 to Bn having relatively low voltages, electric powers are supplied from the electricity storage cell B1 having a relatively high voltage to the electricity storage cells B2 to Bn having relatively low voltages. This causes the electricity storage cell B1 having a relatively high voltage to be discharged to have a decreased voltage and causes the electricity storage cells B2 to Bn having relatively low voltages to be charged to have increased voltages, whereby voltage differences between the electricity storage cells B1 to Bn are reduced, and finally, the voltages of the electricity storage cells B1 to Bn can be equalized.

In the voltage balance correction circuit having the configuration described above, the voltage correction circuits 11 to 1n correspond one-to-one to the electricity storage cells B1 to Bn. In addition, electric connections between the voltage correction circuits 11 to 1n are made only by the parallel connection of the second coils L21 to L2n. For that reason, in designing and producing the voltage balance correction circuit, it suffices only to consider the number of the intended electricity storage cells B1 to Bn, provide the same number of the voltage correction circuits 11 to 1n, and connect the second coils L21 to L2n in parallel. As a result, the voltage balance correction circuit according to the present disclosure has few elements to be designed and produced individually in accordance with the number of the intended electricity storage cells B1 to Bn, which makes it possible to achieve a high versatility.

In addition, in a case of adding a new electricity storage cell Bx (not illustrated) to the electricity storage cells B1 to Bn, it suffices only to add a corresponding voltage correction circuit 1x (not illustrated) and connect a second coil L2x (not illustrated) of the added voltage correction circuit 1x to the second coils L21 to L2n of the existing voltage correction circuits 11 to 1n in parallel (x=n+1). Contrariwise, in a case of removing the electricity storage cell Bn from the electricity storage cells B1 to Bn to decrease the number of the electricity storage cells later, it suffices only to remove the connection of the second coil L2n of the voltage correction circuit 1n to be removed. As a result, the voltage balance correction circuit according to the present disclosure allows one or more of the electricity storage cells B1 to Bn to be added or removed later easily, achieving a high scalability.

As seen from the above, according to the present disclosure, it is possible to provide a voltage balance correction circuit having high versatility and scalability. Moreover, according to the present disclosure, the electric connections between the voltage correction circuits 11 to 1n are made only by the parallel connection of the second coils L21 to L2n, and thus easily support a configuration in which, for example, the voltage correction circuits 11 to 1n are distributed and mounted to multiple circuit boards. Furthermore, there is no constraint on the order of connecting the second coils L21 to L2n, which offers a high flexibility in laying out the voltage correction circuits 11 to 1n.

Figure 2:
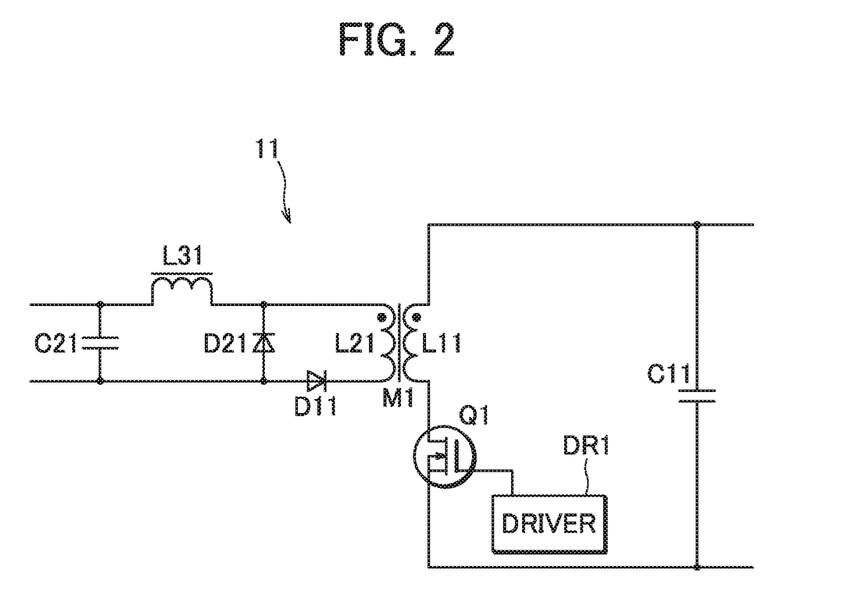
FIG. 2 is a circuit diagram illustrating an example of a more specific configuration of a voltage correction circuit.

FIG. 2 is a circuit diagram illustrating an example of a more specific configuration of the voltage correction circuit 11.

As illustrated in FIG. 2, the voltage correction circuits 11 to 1n, can each have a configuration including an isolated forward converter circuit. Hereafter, description will be made referring to the voltage correction circuit 11 illustrated in FIG. 2.

The voltage correction circuit 11 includes the aforementioned coil L11, coil L21, core M1, field-effect transistor Q1, and driver DR1, as well as capacitors C11 and C21, diodes D11 and D21, and a choke coil L31.

The coil L11 includes a first winding end (a winding start end) connected to one end side of the capacitor C11 and includes a second winding end (a winding final end) connected to a drain terminal of the field-effect transistor Q1. The other end side of the capacitor C11 is connected to a source terminal of the field-effect transistor Q1. A gate terminal of the field-effect transistor Q1 is connected to the driver DR1. The coil L21 includes a first winding end (a winding start end) connected to one end side of the choke coil L31 and includes a second winding end (a winding final end) connected to a cathode of the diode D11.

An anode of the diode D11 is connected to an anode of the diode D21. A cathode of the diode D21 is connected to a connection point between the one end side of the choke coil L31 and the first winding end of the coil L21. One end side of the capacitor C21 is connected to the other end side of the choke coil L31. The other end side of the capacitor C21 is connected to a connection point between the anode of the diode D11 and the anode of the diode D21.

FIG. 2 illustrates an example of the case where the voltage correction circuits 11 to 1n are constituted in a forward system. The Timing when currents flow is the same for the coils L11 to L1n (primary windings) and the coils L21 to L2n (secondary windings), which thus makes it easy to set timing of ON/OFF control over the field-effect transistors Q1 to Qn by the control circuit 10. Therefore, it is possible to equalize the voltages of the electricity storage cells B1 to Bn with high precision.

Figure 3:
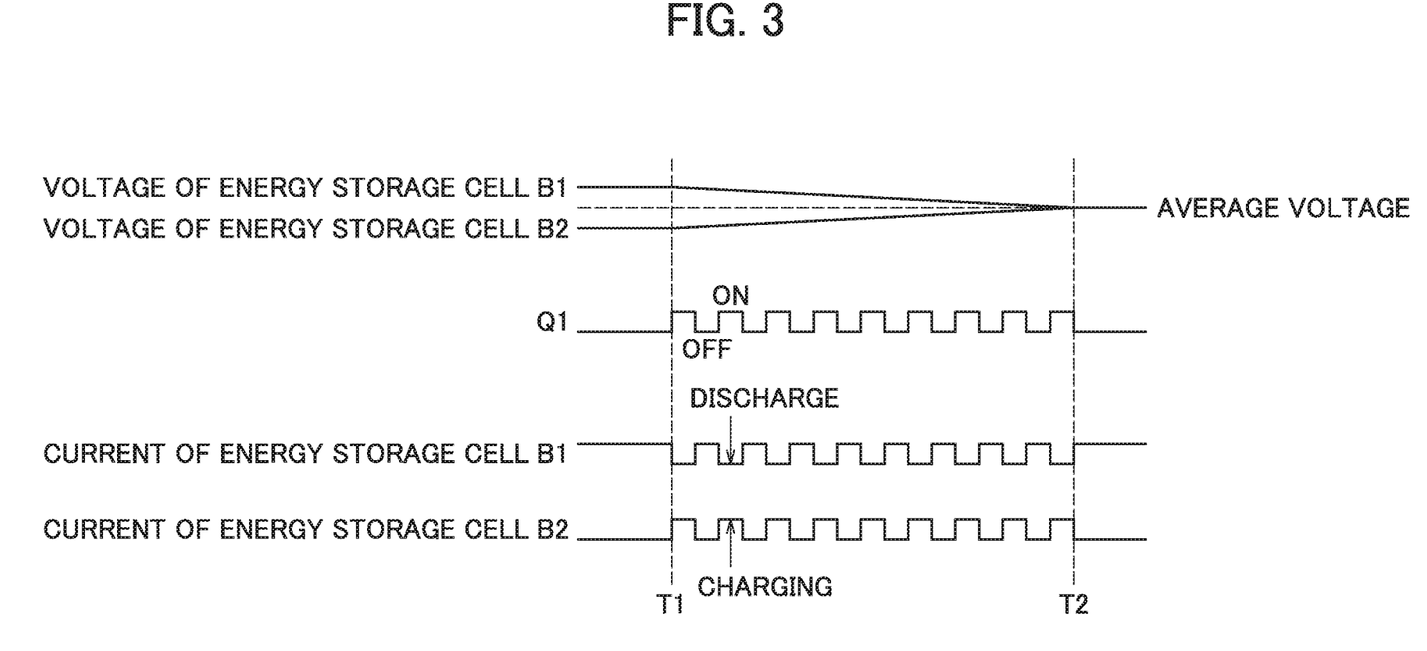
FIG. 3 is a timing chart of a voltage balance correction circuit including voltage correction circuits using an isolated forward converter circuit.

FIG. 3 is a timing chart of the voltage balance correction circuit including the voltage correction circuits 11 to 1n using an isolated forward converter circuit.

Assume here that, for example, the electricity storage cell B1 has the highest voltage of the electricity storage cells B1 to Bn. In such a state, it is preferable that the control circuit 10 alternates ON/OFF of, for example, the field-effect transistor Q1 of the voltage correction circuit 11 corresponding to the electricity storage cell B1 having the highest voltage, and meanwhile keeps the field-effect transistors Q2 to Qn in a rectified state, the field-effect transistors Q2 to Qn being of voltage correction circuits 12 to 1n corresponding to other electricity storage cells B2 to Bn. This causes the electricity storage cell B1 having the highest voltage to be discharged to have a decreased voltage and causes the other electricity storage cells B2 to Bn to be charged to have increased voltages, whereby the voltages of the electricity storage cells B1 to Bn can be equalized in a short time, effectively.

In addition, in the case described above, it is preferable that, while alternating the ON/OFF of, for example, the field-effect transistor Q1 of the voltage correction circuit 11 corresponding to the electricity storage cell B1 having the highest voltage, the control circuit 10 keeps a field-effect transistor selected from among the field-effect transistors Q2 to Qn (e.g., the field-effect transistor Q2) in a rectified state, in accordance with the voltages of the electricity storage cells B2 to Bn. This can reduce unnecessary charging-discharging of the electricity storage cells B1 to Bn when equalizing the voltages of the electricity storage cells B1 to Bn, whereby the voltages of the electricity storage cells B1 to Bn can be equalized in a shorter time, more efficiently.

More specifically, the control circuit 10 detects each voltages of the electricity storage cells B1 to Bn and calculates the average voltage of the electricity storage cells B1 to Bn. Then, the control circuit 10 starts operation for alternating the ON/OFF of the field-effect transistor Q1 of the voltage correction circuit 11 at arbitrary intervals, the voltage correction circuit 11 corresponding to the electricity storage cell B1 having the highest voltage (timing T1 in FIG. 3). At the same time, the control circuit 10 starts operation for keeping the field-effect transistor Q2 of the voltage correction circuit 12 in a rectified state, the voltage correction circuit 12 corresponding to the electricity storage cell B2 having a voltage lower than the average voltage in other electricity storage cells B2 to Bn (with the timing T1 in FIG. 3).

The electricity storage cell B1 having the highest voltage is discharged at the timing when the field-effect transistor Q1 is turned on, and the voltage decreases. Meanwhile, the electricity storage cell B2 having a voltage lower than the average voltage is charged at the timing when the field-effect transistor Q1 is turned on, and the voltage increases. Then, the control circuit 10 keeps the field-effect transistors Q1 and Q2 in an OFF state when the voltage of the electricity storage cell B1 decreases to the average voltage, and the voltage of the electricity storage cell B2 increases to the average voltage (timing T2 in FIG. 3).

Figure 4:
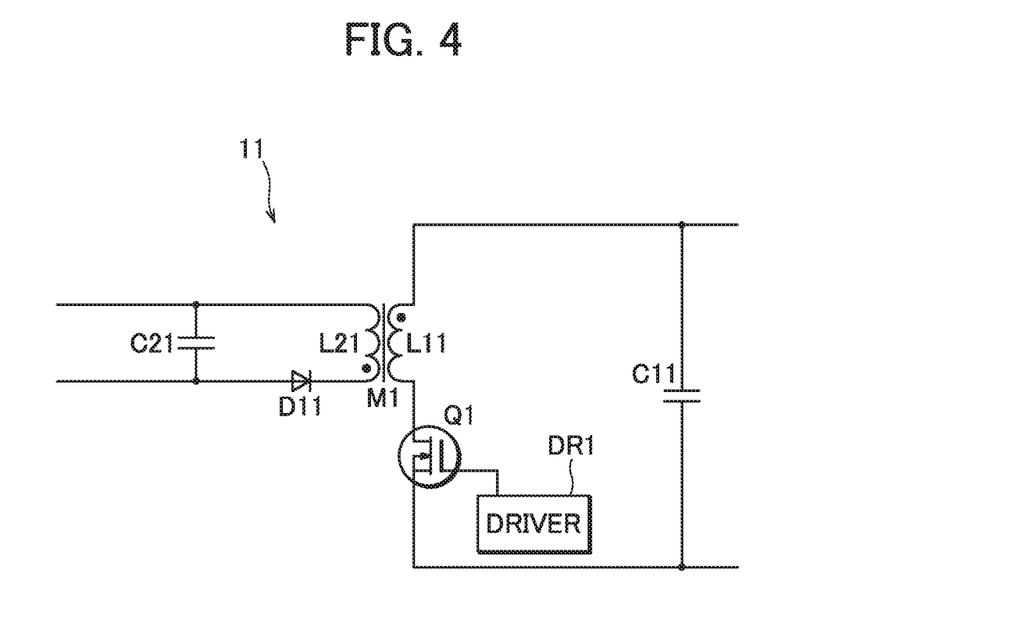
FIG. 4 is a circuit diagram illustrating another example of a more specific configuration of the voltage correction circuit.

FIG. 4 is a circuit diagram illustrating another example of a more specific configuration of the voltage correction circuit 11.

As illustrated in FIG. 4, the voltage correction circuits 11 to 1n, can have a configuration including an isolated flyback converter circuit. Hereafter, description will be made referring to the voltage correction circuit 11 illustrated in FIG. 4.

The voltage correction circuit 11 includes the aforementioned coil L11, coil L21, core M1, field-effect transistor Q1, and driver DR1, as well as capacitors C11 and C21, and a diode D11.

The coil L11 includes a first winding end (a winding start end) connected to one end side of the capacitor C11 and a second winding end (a winding final end) connected to a drain terminal of the field-effect transistor Q1. The other end side of the capacitor C11 is connected to a source terminal of the field-effect transistor Q1. A gate terminal of the field-effect transistor Q1 is connected to the driver DR1. The coil L21 includes a first winding end (a winding start end) connected to a cathode of the diode D11 and includes a second winding end (a winding final end) connected to one end side of the capacitor C21. An anode of the diode D11 is connected to the other end side of the capacitor C21.

Explanation of Reference Signs 10 control circuit
11 to 1n voltage correction circuit
20 energy storage module
B1 to Bn electricity storage cell
DR1 to DRn driver
L11 to L1n first coil
L21 to L2n second coil
M1 to Mn core
Q1 to Qn field-effect transistor

The invention claimed is:

1. A voltage balance correction circuit comprising:
multiple voltage correction circuits corresponding one-to-one to multiple electricity storage cells connected to one another in series; and
a control circuit configured to control the multiple voltage correction circuits based on voltages of the respective electricity storage cells, wherein:
the multiple voltage correction circuits each comprise a first coil connected to a corresponding electricity storage cell in parallel, a switch configured to turn ON/OFF connection of the first coil with the corresponding electricity storage cell under control of the control circuit, and a second coil magnetically coupled with the first coil, the switch configured to turn ON/OFF with a voltage that is lower than a rated voltage of the corresponding electricity storage cell,
through the multiple voltage correction circuits, the second coils of the respective voltage correction circuits are connected to one another in parallel,
each of the multiple voltage correction circuits comprises a switch driver circuit configured to operate on electric power of a corresponding electricity storage cell to turn ON/OFF the switch, and
the control circuit configured to control the switch driver circuit such that the switch driver circuit alternates turning ON/OFF of the switch of a selected one of the multiple voltage correction circuits corresponding to an electricity storage cell having a highest voltage of the multiple electricity storage cells, and meanwhile keeps the switches of remaining ones of the multiple voltage correction circuits, corresponding to remaining ones of the electricity storage cells, in a rectified state.

2. The voltage balance correction circuit according to claim 1, wherein the control circuit selects an electricity storage cell corresponding to the voltage correction circuit of which a switch is to be kept in a rectified state, in accordance with voltages of the electricity storage cells.

3. The voltage balance correction circuit according to claim 1, wherein the voltage correction circuits are each an isolated forward converter circuit or an isolated flyback converter circuit constituted by the first coil as a primary winding and the second coil as a secondary winding.

* * * * *